US012754411B1

(12) United States Patent
Wang

(10) Patent No.: US 12,754,411 B1
(45) Date of Patent: Oct. 6, 2026

(54) SIGHT WITH DETACHABLE EYEPIECE

(71) Applicant: Peng Wang, Yueyang (CN)

(72) Inventor: Peng Wang, Yueyang (CN)

( * ) Notice: Subject to any disclaimer, the term of this patent is extended or adjusted under 35 U.S.C. 154(b) by 0 days.

(21) Appl. No.: 19/315,736

(22) Filed: Sep. 1, 2025

(51) Int. Cl.
*G02B 23/16* (2006.01)
*G02B 25/00* (2006.01)

(52) U.S. Cl.
CPC ........... *G02B 23/16* (2013.01); *G02B 25/001* (2013.01)

(58) Field of Classification Search
CPC .............................. G02B 23/16; G02B 25/001
USPC .......................................................... 359/818
See application file for complete search history.

(56) References Cited

U.S. PATENT DOCUMENTS

2004/0257645 A1* 12/2004 Kitajima ............ G02B 21/0012 359/368
2005/0146801 A1* 7/2005 Nagata ................. G02B 17/086 359/811
2008/0285158 A1* 11/2008 Okabe ..................... G02B 21/02 359/739
2015/0033882 A1* 2/2015 Rudoy ................... G05G 17/00 74/2
2016/0041381 A1* 2/2016 Makiyama ......... G02B 23/2438 359/824
2023/0341674 A1* 10/2023 Guo ..................... G02B 25/001
2023/0408801 A1* 12/2023 Kusaka ................ G02B 21/368

* cited by examiner

*Primary Examiner* — Mohammed A Hasan

(57) ABSTRACT

A sight with a detachable eyepiece includes a sight main body, an objective lens and an eyepiece lens. The sight main body includes an observation portion and a connection portion opposite to the observation portion. A side of the sight main body close to the observation portion is provided with a mounting portion. The objective lens is connected to the connection portion. The eyepiece lens is detachably connected to the mounting portion, and the eyepiece lens is configured for observation.

17 Claims, 13 Drawing Sheets

SIGHT WITH DETACHABLE EYEPIECE

TECHNICAL FIELD

The present invention relates to the technical field of a sight, in particular to a sight with a detachable eyepiece.

BACKGROUND ART

At present, as a frequently used optical aiming device, the sight is widely used in military, law enforcement, hunting, competitive shooting and other fields. The existing sight usually includes a main body, an objective lens and an eyepiece lens. When using the sight, users need to select an appropriate aiming device according to different usage environment and target distance. However, the eyepiece of the existing sight is fixedly connected to the main body and can not be detached, which brings much inconvenience in maintenance, function extension, and etc.

The eyepiece and the main body of the existing sight are usually of an integrated structure. When the eyepiece is contaminated, damaged or needs to be replaced with different specifications, the whole sight often needs to be replaced. Thus, the maintenance cost is high and it is inconvenient to carry. At the same time, for the traditional sight, it is unable to replace with eyepieces of different magnification or optical characteristics according to different usage requirements, and the functional adaptability is limited.

SUMMARY

As for the above-mentioned problems in the prior art, the present invention provides a sight with a detachable eyepiece, and realizes a detachable function of the eyepiece. This meets different needs of maintenance and function extension in different usage scenarios.

The technical solution adopted by the present invention to solve the technical problems is as follows. The sight includes a sight main body, an objective lens and an eyepiece lens. The sight main body includes an observation portion and a connection portion opposite to the observation portion. A side of the sight main body close to the observation portion is provided with a mounting portion. The objective lens is connected to the connection portion. The eyepiece lens is detachably connected to the mounting portion, and the eyepiece lens is configured for observation.

Further, the eyepiece lens includes an eyepiece housing and an eyepiece optical system arranged in the eyepiece housing. The eyepiece optical system is connected to the eyepiece housing. The eyepiece housing is detachably connected to the mounting portion, and the eyepiece optical system is configured for observation.

Further, the sight main body is provided with a display module. The eyepiece optical system is arranged facing the display module. The eyepiece optical system is configured for magnifying images of the display module.

Further, the objective optical lens includes an objective lens housing and an objective lens optical system arranged in the objective lens housing. The objective lens optical system is electrically connected to the display module. The display module is configured for displaying images collected by the objective lens optical system.

Further, the objective lens housing is provided with a first connection portion. The first connection portion is arranged along an end surface of the objective lens housing.

Further, the eyepiece housing is equipped with a second connection portion. The mounting portion is a first mounting port, and the second connection portion is detachably connected to the first mounting port.

Further, an outer side wall of the second connection portion is equipped with a first external thread, and an inner side wall of the first mounting port is equipped with a first internal thread. The first external thread is connected to the first internal thread. The first external thread is capable of rotating along the first internal thread.

Further, the sight main body includes a mounting housing and a rotating sleeve. The first mounting port is arranged in the rotating sleeve. A first end of the rotating sleeve is connected to the mounting housing through a connection assembly. The second connection portion is connected to a second end of the rotating sleeve.

Further, a lower side of the rotating sleeve is configured for extending to form a plurality of lugs. The plurality of lugs include a first lug unit and a second lug unit. The first lug unit and the second lug unit are spaced apart from each other. The first lug unit and the second lug unit are detachably connected to the mounting housing through the connection assembly.

Further, the connection assembly includes a first adjusting screw, a second adjusting screw and a third adjusting screw. The first lug unit is provided with a first screw hole, and the second lug unit is provided with a second screw hole. An upper side of the rotating sleeve is provided with a third screw hole. A lower side of the mounting housing is equipped with a first mounting hole and a second mounting hole, and an upper side of the mounting housing is equipped with a third mounting hole. When the rotating sleeve is connected on the mounting housing, the first adjusting screw is configured for sequentially passing through the first screw hole and the first mounting hole, the second adjusting screw is configured for sequentially passing through the second screw hole and the second mounting hole, and the third adjusting screw is configured for sequentially passing through the third screw hole and the third mounting hole. In this way, the rotating sleeve is connected to the mounting housing.

Further, the connection portion is provided with a second mounting port, and the first connection portion is detachably connected to the second mounting port.

Further, an outer side wall of the first connection portion is equipped with a second external thread, and an inner side wall of the second mounting port is equipped with a second internal thread. The second external thread is connected to the second internal thread. The second external thread is capable of rotating along the second internal thread.

Further, the second mounting port is equipped with a fourth adjusting screw. The fourth adjusting screw is connected to the sight main body, and the fourth adjusting screw is movable between an adjusting position and a locked position. When the fourth adjusting screw is in the locked position, a first end of the fourth adjusting screw is configured for tightly abutting against the first connection portion. Thus, the objective optical lens is not capable of detaching from the second mounting port, and the objective optical lens is capable of rotating in the second mounting port. When the fourth adjusting screw is in the adjusting position, the fourth adjusting screw is configured for separating from the first connection portion. In addition, the second external thread is capable of rotating along the second internal thread, so that the objective optical lens is enabled to detach from the second mounting port.

Further, the display module is a display screen, and the display module further includes a touch screen. The touch screen is arranged in parallel with the display screen, and the touch screen is electrically connected to the display screen. The touch screen and the display screen are both arranged in the sight main body. The display screen is electrically connected to the objective lens optical system. The touch screen and the display screen are positioned between the objective lens and the eyepiece lens.

Further, the eyepiece optical system includes a first lens, a second lens and an optical channel. The first lens is arranged on a first end of the eyepiece housing and the second lens is arranged on a second end of the eyepiece housing. The optical channel is arranged between the first lens and the second lens. The first lens and the second lens are arranged along an axial direction, and a complete optical path system is thereby formed through the optical channel.

Further, the eyepiece housing includes an inner housing, an outer housing, an adjusting housing and an adjusting ring sleeved on the adjusting housing. The inner housing is arranged in an inner portion of the eyepiece housing. The outer housing is sleeved at an outer portion of the inner housing. The adjusting housing is movably arranged on the inner housing. The adjusting housing is positioned between the inner housing and the outer housing. The first lens is installed on an end portion of the inner housing, and the second lens is installed on an end portion of the adjusting housing. The optical channel is formed between the first lens and the second lens. The adjusting ring is rotatably sleeved at an outer portion of the outer housing, and the adjusting ring is threadedly connected to the adjusting housing. By rotating the adjusting ring to drive the adjusting housing to move along an axial direction, an axial distance between the first lens and the second lens is thereby adjusted.

Further, a plurality of annular grooves and a sealing ring are arranged on a side wall of the first connection portion. The sealing ring is sleeved on one of the plurality of annular grooves. The sealing ring is tightly compressed by an inner wall of the second mounting port, and inner walls of the annular grooves are tightly compressed by the sealing ring.

Further, a fourth screw hole is arranged on a side wall of the second mounting port. The plurality of annular grooves include a first annular groove and a second annular groove. The sealing ring is sleeved on the first annular groove. When the objective optical lens is installed in the second mounting port, the fourth adjusting screw is configured for abutting against the second annular groove through the fourth screw hole. The second annular groove is equipped with a first limiting portion and a second limiting portion. When the fourth adjusting screw abuts against the first limiting portion, the fourth adjusting screw is configured for adjusting the objective optical lens to conduct remote observation. When the fourth adjusting screw abuts against the second limiting portion, the fourth adjusting screw is configured for adjusting the objective optical lens to conduct close observation.

Further, a control module is arranged on sight main body. The control module includes a control button and a first main board configured for receiving and sending users' operation instructions. A control switch is arranged on the first main board. The control button is movable between a pressed position and a releasing position. When the control button is in the pressed position, the control button is configured for abutting against the control switch to achieve a communication connection. When the control button is in the releasing position, the control button is configured for detaching from the control switch. In addition, a side wall of the control button is configured for abutting against an inner wall of the sight main body.

Further, the sight main body further includes a power supply assembly. The power supply assembly includes a battery chamber, a power supply battery and a battery cover. The battery chamber is positioned in the sight main body. The power supply battery is detachably arranged in the battery chamber. When the power supply battery is arranged in the battery chamber, a positive electrode of the power supply battery is electrically connected to an electrical contact of the battery chamber. The battery cover is configured for covering the battery chamber. An electrical contact of the battery cover is electrically connected to a negative electrode of the power supply battery. The power supply battery is electrically connected to the objective lens optical system and the display screen, so as to provide working power supply for the objective lens optical system and the display screen.

Beneficial effects of the present invention are as follows. Through the arrangement of the above structure, when in use, the eyepiece lens is capable of being detachably connected to the mounting portion of the main body. In this way, quick disassembly and installation of the eyepiece is achieved. Thus, users can replace with eyepieces of different specifications according to actual needs. This meets requirements of different usage environments, and facilitates maintenance, carriage and storage.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
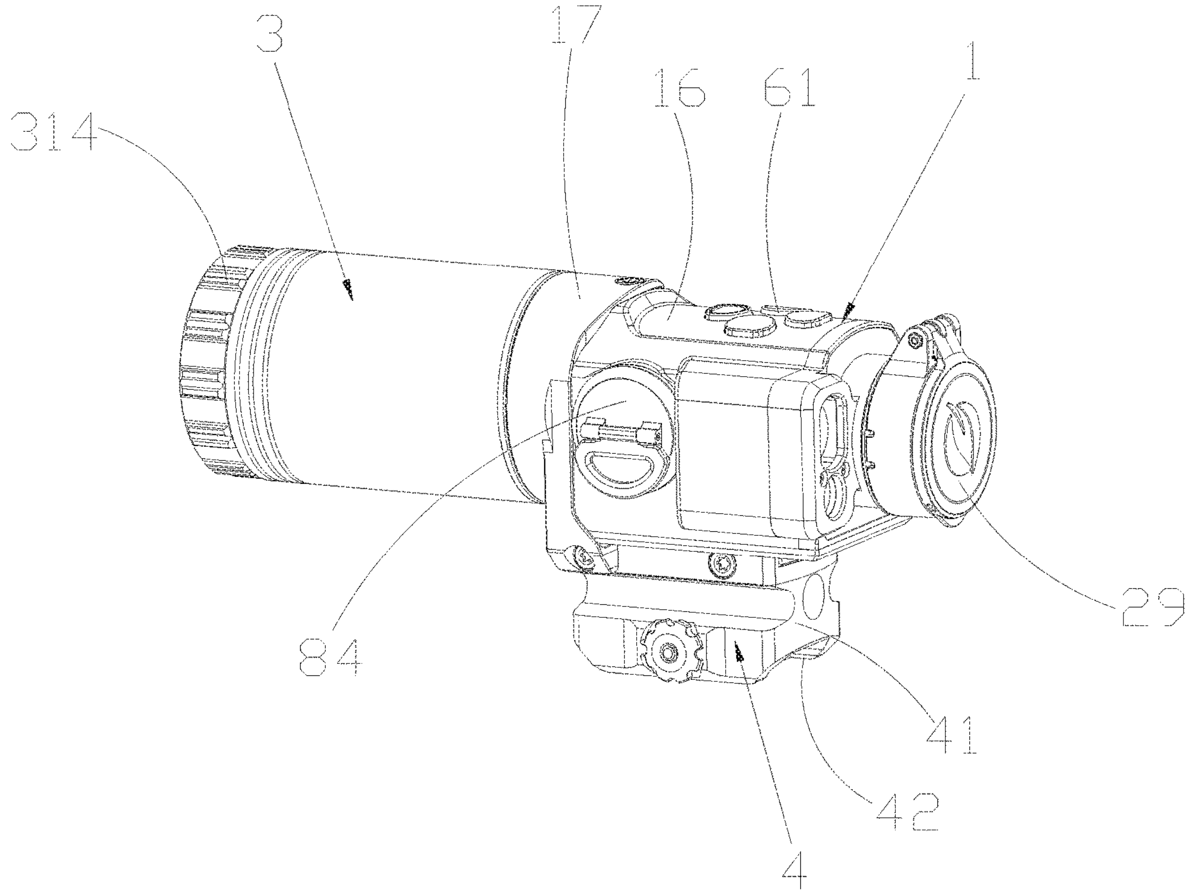
FIG. 1 is an overall structure diagram of the first embodiment of the present invention.
Figure 2:
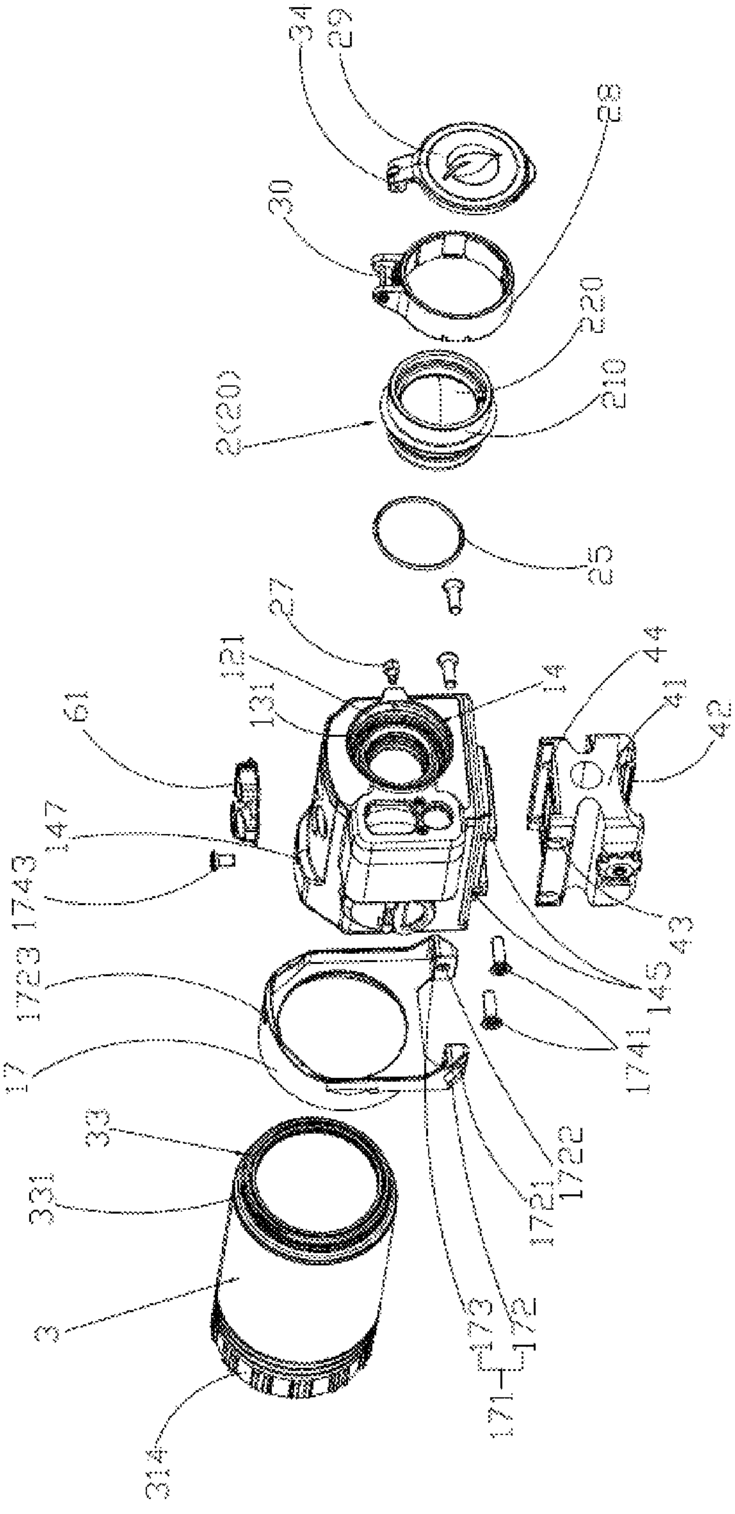
FIG. 2 is an exploded structure diagram of an angle of the first embodiment of the present invention.
Figure 3:
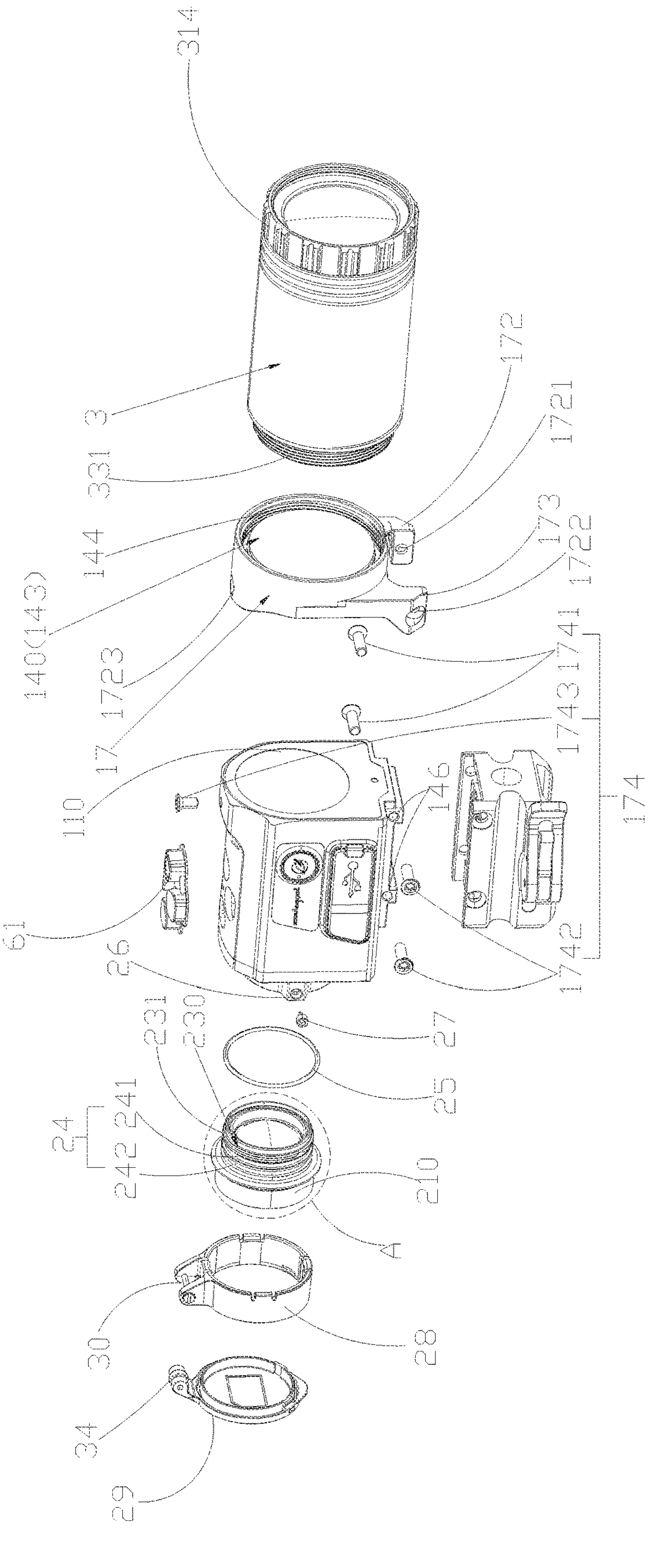
FIG. 3 is an exploded structure diagram of another angle of the first embodiment of the present invention.
Figure 4:
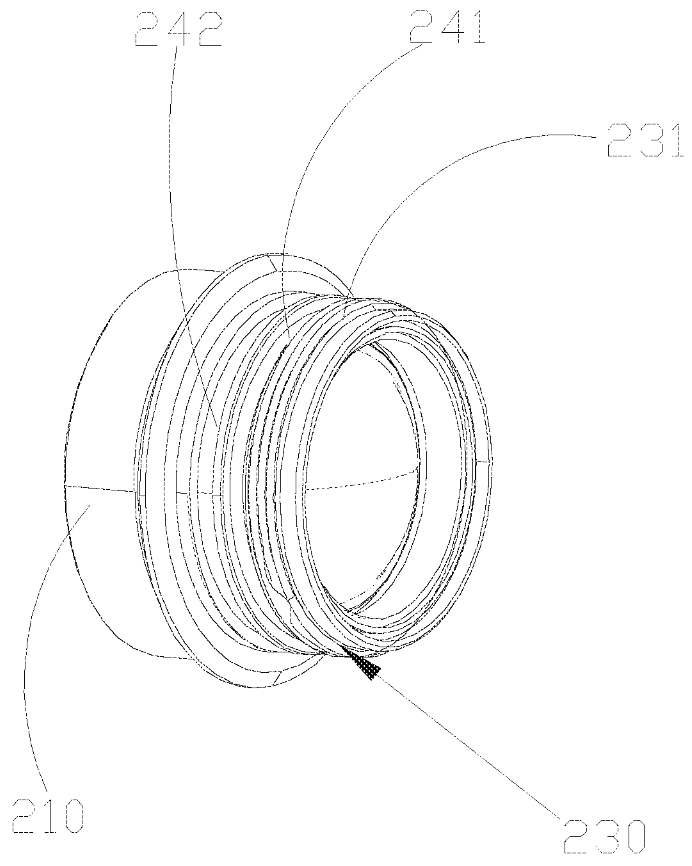
FIG. 4 is an enlarged view of area A in FIG. 3.
Figure 5:
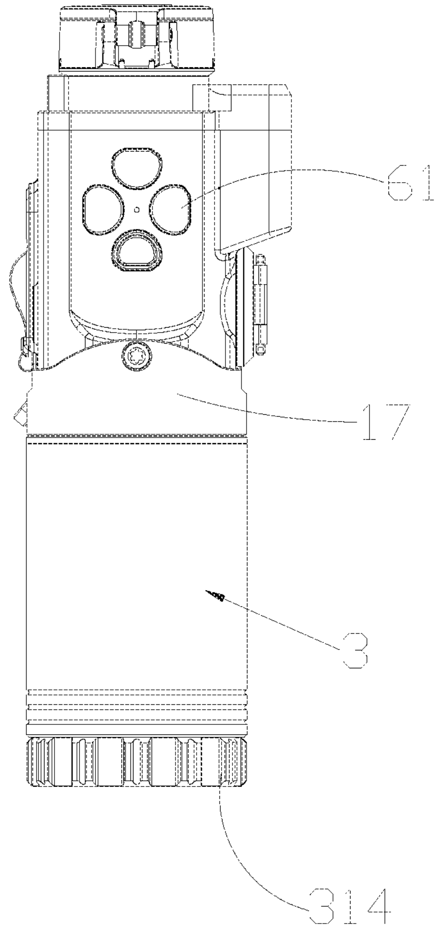
FIG. 5 is a vertical view of the first embodiment of the present invention.
Figure 6:
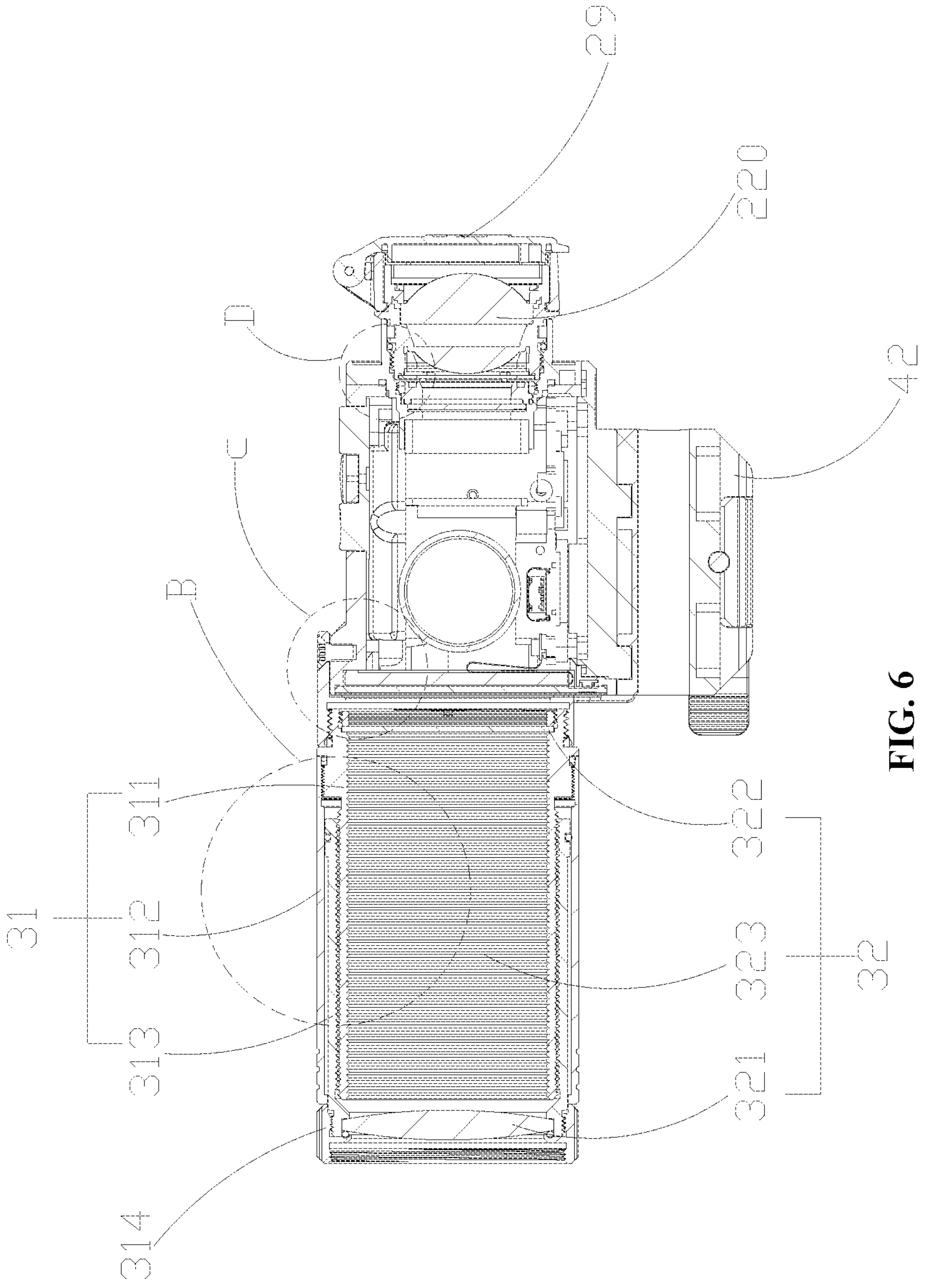
FIG. 6 is a sectional view of FIG. 5.
Figure 7:
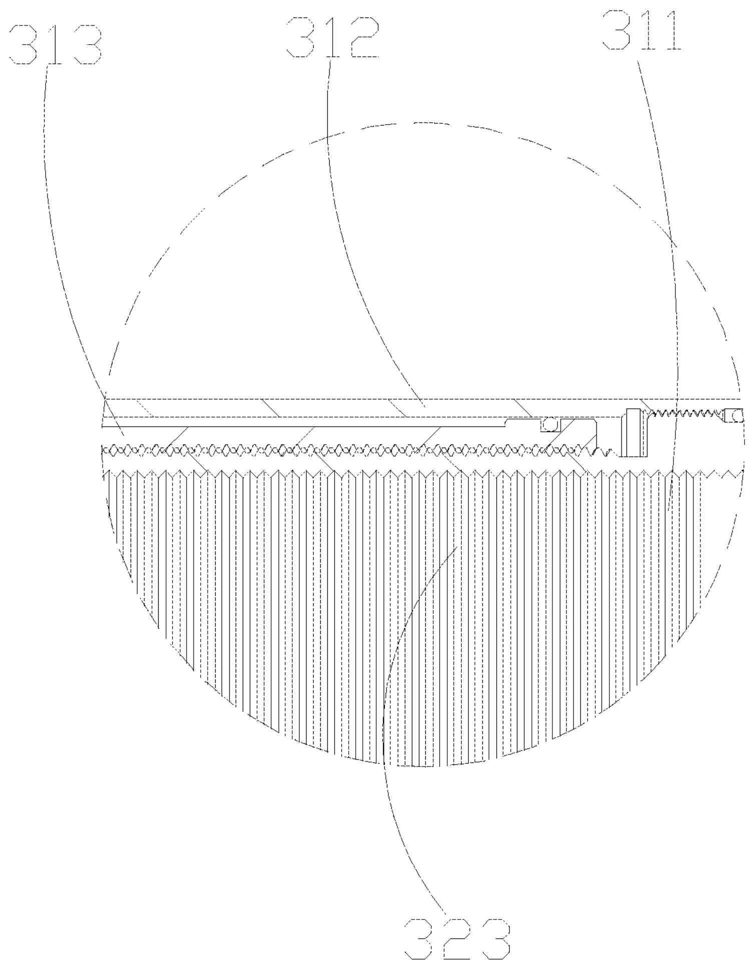
FIG. 7 is an enlarged view of area B in FIG. 6.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term “comprising” when utilized, means “including, but not necessarily limited to”; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to “an” or “one” embodiment in this disclosure are not necessarily to the same embodiment, and such references can mean “at least one”. In addition, the terms “first” and “second” are used for descriptive purposes only and cannot be understood as indicating or implying relative importance or implying the number of indicated technical features. Thus, the features defined as “first” and “second” may explicitly or implicitly include one or more of the features. In the description of embodiments of the application, “a plurality of” means two or more, unless otherwise specifically defined.

Referring to FIG. 1 to FIG. 13, the present invention provides a sight with a detachable eyepiece. The sight includes a sight main body 1. The sight main body 1 includes an observation portion 110 and a connection portion 14 opposite to the observation portion 110. A side of the sight main body 1 close to the observation portion 110 is provided with a mounting portion 140. The sight further includes an objective optical lens 2. The objective optical lens 2 is connected to the connection portion 14. The sight further includes an eyepiece lens 3. The eyepiece lens 3 is detachably connected to the mounting portion 140, and the eyepiece lens 3 is configured for observation.

Through the arrangement of the above structure, the sight includes the sight main body 1, and the observation portion 110 and the connection portion 14 are arranged in the sight main body 1. The observation portion 110 is configured for enabling users to observe, and the connection portion 14 is configured for connecting the objective optical lens 2. The objective optical lens 2 is connected to the connection portion 14 and is configured for collecting target images. The eyepiece lens 3 is detachably connected to the mounting portion 140 and is configured for observing images of a display module 15. This enables the eyepiece lens 3 to be replaced according to different usage requirements, and realizes a modular design. Thus, users can select eyepiece lenses 3 of different specifications according to different observation distances and environmental conditions, thereby further improving the practicality and adaptability of the sight.

In this embodiment, the eyepiece lens 3 includes an eyepiece housing 31 and an eyepiece optical system 32 arranged in the eyepiece housing 31. The eyepiece optical system 32 is connected to the eyepiece housing 31. The eyepiece housing 31 is detachably connected to the mounting portion 140, and the eyepiece optical system 32 is configured for observation. Through the arrangement of the above structure, the eyepiece optical system 32 is connected to the eyepiece housing 31, and the eyepiece housing 31 is detachably connected to the mounting portion 140. Meanwhile, users can replace with the eyepiece lenses 3 of different specifications according to actual needs. Thus, the sight is enabled to adapt to different observation requirements and usage environments.

In this embodiment, the sight main body 1 is provided with the display module 15. The eyepiece optical system 32 is arranged facing the display module 15. The eyepiece optical system 32 is configured for magnifying images of the display module 15. Through the arrangement of the above structure, the display module 15 is capable of displaying images collected by the objective optical lens 2. Through the arrangement of facing the display module 15, the eyepiece optical system 32 is capable of magnifying the images on the display module 15. This enables users to clearly observe the target image through the observation portion 110, thereby achieving a perfect combination of electronic display and optical observation.

In this embodiment, the objective optical lens 2 includes an objective lens housing 210 and an objective lens optical system 220 arranged in the objective lens housing 210. The objective lens optical system 220 is electrically connected to the display module 15. The display module 15 is configured for displaying images collected by the objective lens optical system 220. Through the arrangement of the above structure, the objective lens optical system 220 is capable of transmitting the collected target images to the display module 15 in real time to display, through an electrical connection with the display module 15. Thus, a complete process of image collection, image processing and image display is formed. Moreover, the stability and real-time performance of image transmission is ensured.

In this embodiment, the objective lens housing 210 is provided with a first connection portion 230. The first connection portion 230 is arranged along an end surface of the objective lens housing 210. During use, the objective lens optical system 220 is configured for collecting target images. In addition, the design of the first connection portion 230 ensures a reliable connection with the sight main body 1.

Referring to FIG. 1 to FIG. 7, there is a first embodiment. In the first embodiment, the objective optical lens 2 is designed with a specification of 19 mm. The objective lens of 19 mm is suitable for application scenarios requiring high compactness, such as close-range target sighting and usage environment with a priority of portability. The objective lens of 19 mm has features of compactness and portability, and an overall weight of the objective lens is lighter, which is suitable for situations requiring long-time carriage and fast mobility. Meanwhile, the objective lens of 19 mm has good response speed and imaging performance during close-range target sighting.

Figure 8:
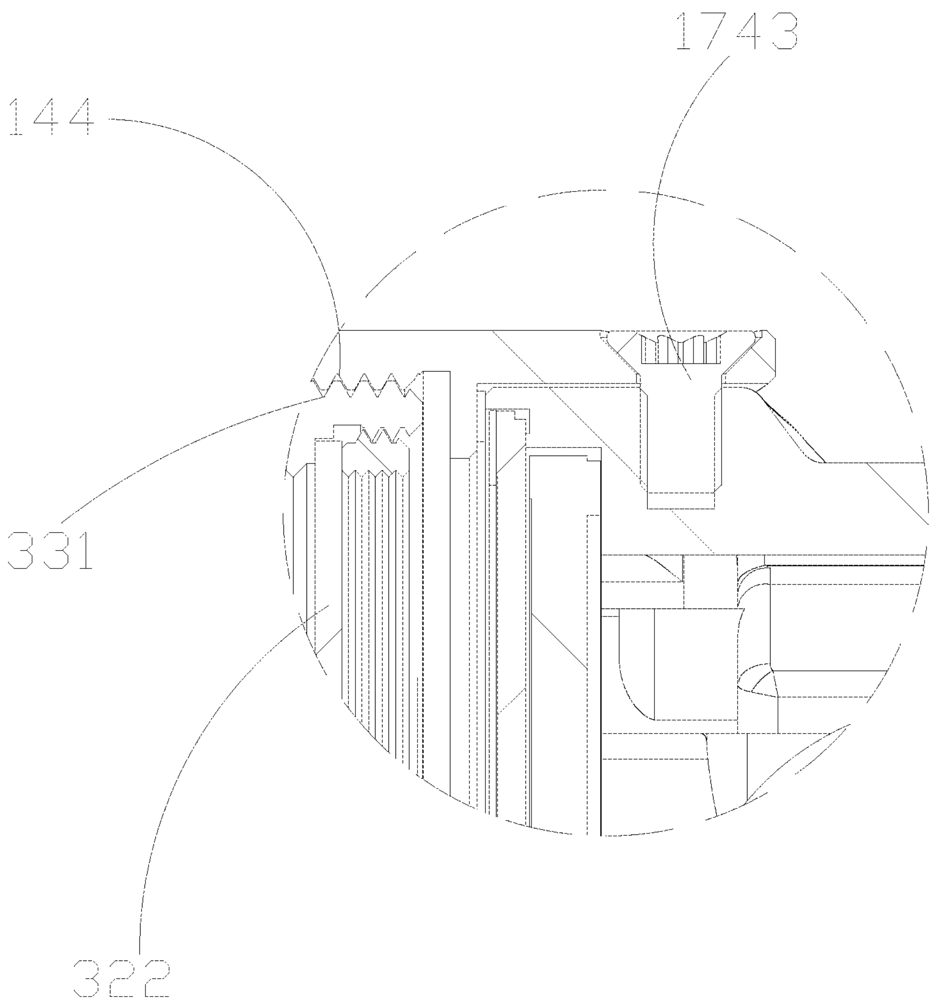
FIG. 8 is an enlarged view of area C in FIG. 6.
Figure 9:
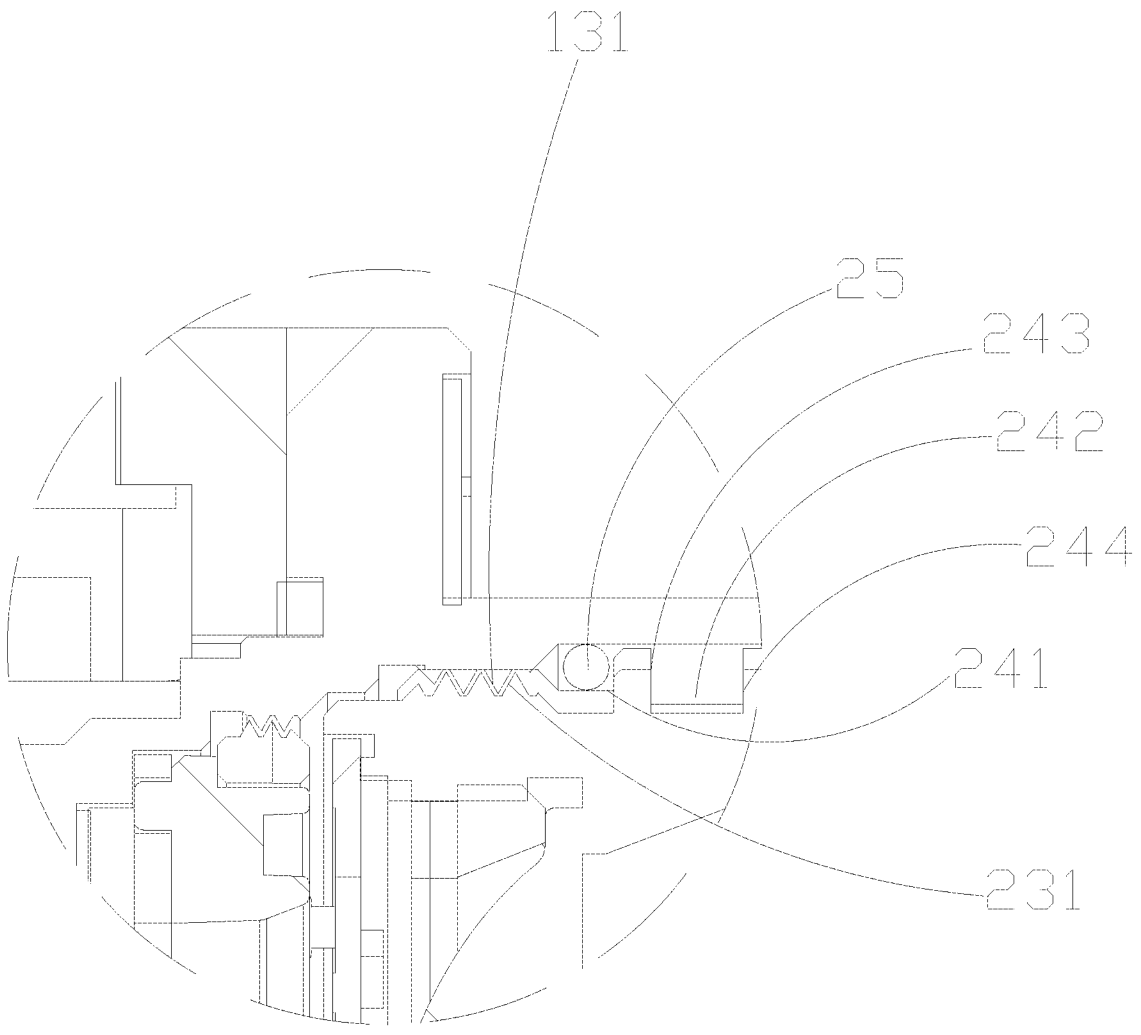
FIG. 9 is an enlarged view of area D in FIG. 6.

Referring to FIG. 8, there is a second embodiment. In the second embodiment, the objective optical lens 2 is designed with a specification of 25 mm. The objective lens of 25 mm is suitable for application scenarios requiring larger aperture and better light intake, such as remote target observation and usage in low light environment. The objective lens of 25 mm has larger effective aperture, and provides better optical resolution and imaging quality, which is especially suitable for observation under low light conditions such as at dusk and night, and professional application scenarios requiring high-precision remote aiming.

In this embodiment, the eyepiece housing 31 is equipped with a second connection portion 33. The mounting portion 140 is a first mounting port 143, and the second connection portion 33 is detachably connected to the first mounting port 143. Through the arrangement of the above structure, the second connection portion 33 enables users to quickly replace with the eyepiece lenses 3 of different specifications according to needs, through a detachable connection with the first mounting port 143. This realizes the modular design of the eyepiece lens, and enables the sight to adapt to different observation requirements.

In this embodiment, an outer side wall of the second connection portion 33 is equipped with a first external thread 331, and an inner side wall of the first mounting port 143 is equipped with a first internal thread 144. The first external thread 331 is connected to the first internal thread 144. The first external thread 331 is capable of rotating along the first internal thread 144. Through the arrangement of the above structure, during use, users can make the first external thread 331 rotate along the first internal thread 144 by rotating the eyepiece lens 3, so as to achieve the connection or separation between the eyepiece lens 3 and the sight main body 1. This enables users to quickly replace with eyepiece lenses 3 of different specifications according to their needs without professional tools.

In this embodiment, the sight main body 1 includes a mounting housing 16 and a rotating sleeve 17. The first mounting port 143 is arranged in the rotating sleeve 17. A first end of the rotating sleeve 17 is connected to the mounting housing 16 through a connection assembly 174. The second connection portion 33 is connected to a second end of the rotating sleeve 17. Through the arrangement of the above structure, the rotating sleeve 17 is connected to the mounting housing 16 through the connection assembly 174. In addition, through the design of arranging the first mounting port 143 in the rotating sleeve 17, the eyepiece lens 3 is enabled to realize a flexible angle adjustment through the rotating sleeve 17. This enables users to adjust a position of the eyepiece lens 3 according to different observation postures.

In this embodiment, a lower side of the rotating sleeve 17 is configured for extending to form a plurality of lugs 171. The plurality of lugs 171 include a first lug unit 172 and a second lug unit 173. The first lug unit 172 and the second lug unit 173 are spaced apart from each other. The first lug unit 172 and the second lug unit 173 are detachably connected to the mounting housing 16 through the connection assembly 174. Through the arrangement of the above structure, the arrangement of the plurality of lugs 171 realizes a stable multi point support structure between the rotating sleeve 17 and mounting housing 16. The spaced arrangement between the first lug unit 172 and the second lug unit 173 ensures the connection stability, thereby preventing looseness or deviation during use.

In this embodiment, the connection assembly 174 includes a first adjusting screw 1741, a second adjusting screw 1742 and a third adjusting screw 1743. The first lug unit 172 is provided with a first screw hole 1721, and the second lug unit 173 is provided with a second screw hole 1722. An upper side of the rotating sleeve is provided with a third screw hole 1723. A lower side of the mounting housing 16 is equipped with a first mounting hole 145 and a second mounting hole 146, and an upper side of the mounting housing 16 is equipped with a third mounting hole 147. When the rotating sleeve 17 is connected on the mounting housing 16, the first adjusting screw 1741 is configured for sequentially passing through the first screw hole 1721 and the first mounting hole 145, the second adjusting screw 1742 is configured for sequentially passing through the second screw hole 1722 and the second mounting hole 146, and the third adjusting screw 1743 is configured for sequentially passing through the third screw hole 1723 and the third mounting hole 147. In this way, the rotating sleeve 17 is connected to the mounting housing 16. Through the arrangement of the above structure, the arrangement of the three adjusting screw enables the rotating sleeve 17 and the mounting housing 16 to together form a three-point fixed structure. With the cooperation of corresponding screw hole and mounting hole, each adjusting screw ensures the accuracy and reliability of the connection. Meanwhile, users are allowed to make small adjustment to realize precise alignment.

In this embodiment, the connection portion 14 is provided with a second mounting port 121, and the first connection portion 230 is detachably connected to the second mounting port 121. Through the arrangement of the above structure, the arrangement of the second mounting port 121 enables the objective optical lenses 2 of different specifications to realize a standardized connection through the first connection portion 230. Thus, users can quickly replace with objective optical lenses 2 of different focal length or aperture according to the observation requirements.

In this embodiment, an outer side wall of the first connection portion 230 is equipped with a second external thread 231, and an inner side wall of the second mounting port 121 is equipped with a second internal thread 131. The second external thread 231 is connected to the second internal thread 131. The second external thread 231 is capable of rotating along the second internal thread 131. Through the arrangement of the above structure, during use, users can make the second external thread 231 rotate along the second internal thread 131 by rotating the objective optical lens 2. In this way, an installation depth and an installation angle of the objective optical lens 2 is adjusted, and precise focus length adjustment and optical axis alignment is realized.

In this embodiment, the second mounting port 121 is equipped with a fourth adjusting screw 27. The fourth adjusting screw 27 is connected to the sight main body 1, and the fourth adjusting screw 27 is movable between an adjusting position and a locked position. When the fourth adjusting screw 27 is in the locked position, the fourth adjusting screw 27 is configured for tightly abutting against the first connection portion 230. Thus, the objective optical lens 2 is not capable of detaching from the second mounting port 121, and the objective optical lens 2 is capable of rotating in the second mounting port 121. When the fourth adjusting screw 27 is in the adjusting position, the fourth adjusting screw 27 is configured for separating from the first connection portion 230. In addition, the second external thread 231 is capable of rotating along the second internal thread 131, so that the objective optical lens 2 is enabled to detach from the second mounting port 121. Through the arrangement of the above structure, the fourth adjusting screw 27 is movable between the adjusting position and the locked position, so that quick locking and releasing functions of the objective optical lens 2 are realized. When the fourth adjusting screw 27 tightly abuts against the first connection portion 230, the objective optical lens 2 is capable of making rotational adjustment in the second mounting port 121 within a limited range. Meanwhile, the fourth adjusting screw 27 is capable of ensuring that the objective optical lens 2 can not detach from the second mounting port 121. When the fourth adjusting screw 27 separates from the first connection portion 230, users are allowed to take out the objective optical lens 2 from the second mounting port 121, thereby facilitating replacement or maintenance.

In this embodiment, the display module 15 is a display screen 152, and the display module 15 further includes a touch screen 151. The touch screen 151 is arranged in parallel with the display screen 152, and the touch screen 151 is electrically connected to the display screen 152. The touch screen 151 and the display screen 152 are both arranged in the sight main body 1. The display screen 152 is electrically connected to the objective lens optical system 220. The touch screen 151 and the display screen 152 are positioned between the objective optical lens 2 and the eyepiece lens 3. Through the arrangement of the above structure, the touch screen 151 is electrically connected to the display screen 152. In addition, through arranging the touch screen 151 and the display screen 152 between the objective optical lens 2 and the eyepiece lens 3, users are enabled to set parameter through the touch screen 151. Meanwhile, users can observe images through the display screen 152, thereby realizing a perfect combination between human-computer interaction and image display.

In this embodiment, the eyepiece optical system includes a first lens 321, a second lens 322 and an optical channel 323. The first lens 321 is arranged on a first end of the eyepiece housing 31 and the second lens 322 is arranged on a second end of the eyepiece housing 31. The optical channel 323 is arranged between the first lens 321 and the second lens 322. The first lens 321 and the second lens 322 are arranged along an axial direction, and a complete optical path system is thereby formed through the optical channel 323. Through the arrangement of the above structure, by connecting the first lens 321 with the second lens 322 via the optical channel 323, and by arranging the two lenses along the axial direction, thereby forming a complete optical magnification system. Moreover, this ensures clear magnification and accurate transmission of the images.

In this embodiment, the eyepiece housing 31 includes an inner housing 311, an outer housing 312, an adjusting housing 313 and an adjusting ring 314 sleeved on the adjusting housing 313. The inner housing 311 is arranged in an inner portion of the eyepiece housing 31. The outer housing 312 is sleeved at an outer portion of the inner housing 311. The adjusting housing 313 is movably arranged on the inner housing 311. The adjusting housing 313 is positioned between the inner housing 311 and the outer housing 312. The first lens 321 is installed on an end portion of the inner housing 311, and the second lens 322 is installed on an end portion of the adjusting housing 313. The optical channel 323 is formed between the first lens 321 and the second lens 322. The adjusting ring 314 is rotatably sleeved at an outer portion of the outer housing 312, and the adjusting ring 314 is threadedly connected to the adjusting housing 313. By rotating the adjusting ring 314 to drive the adjusting housing 313 to move along an axial direction, an axial distance between the first lens 321 and the second lens 322 is thereby adjusted. Through the arrangement of the above structure, during use, users can drive the adjusting housing 313 to move along the axial direction by rotating the adjusting ring 314, thereby achieving accurate visibility adjustment. Thus, different users can have clear observation effects.

In this embodiment, a plurality of annular grooves 24 and a sealing ring 25 are arranged on a side wall of the first connection portion 230. The sealing ring 25 is sleeved on one of the plurality of annular grooves 24. The sealing ring 25 is tightly compressed by an inner wall of the second mounting port 121, and inner walls of the annular grooves 24 are tightly compressed by the sealing ring 25. Through the arrangement of the above structure, the arrangement of the plurality of annular grooves 24 enables the sealing ring 25 to select an appropriate mounting position according to different sealing requirements. Through a dual compression by the inner wall of the second mounting port 121 and the inner walls of the annular grooves 24, the sealing ring 25 ensures a reliable sealing of the connection, and effectively prevents external substances from entering into the optical system.

In this embodiment, a fourth screw hole 26 is arranged on a side wall of the second mounting port 121. The plurality of annular grooves 24 include a first annular groove 241 and a second annular groove 242. The sealing ring 25 is sleeved on the first annular groove 241. When the objective optical lens 2 is installed in the second mounting port 121, the fourth adjusting screw 27 is configured for abutting against the second annular groove 242 through the fourth screw hole 26. The second annular groove 242 is equipped with a first limiting portion 243 and a second limiting portion 244. When the fourth adjusting screw 27 abuts against the first limiting portion 243, the fourth adjusting screw 27 is configured for adjusting the objective optical lens 2 to conduct remote observation. When the fourth adjusting screw 27 abuts against the second limiting portion 244, the fourth adjusting screw 27 is configured for adjusting the objective optical lens 2 to conduct close observation. Through the arrangement of the above structure, when the fourth adjusting screw 27 is in the locked position, a rotational range of the objective optical lens 2 is limited by the cooperation between the first limiting portion 243 and the fourth adjusting screw 27, and the cooperation between the second limiting portion 244 and the fourth adjusting screw 27. Thus, the objective optical lens 2 can not be taken out. The objective optical lens 2 is capable of rotating inwards to the first limiting portion 243, so as to adjust the clarity of object when the objective optical lens 2 is used for remote observation. Additionally, the objective optical lens 2 is capable of rotating outwards to the second limiting portion 244, so as to adjust the clarity of object when the objective optical lens 2 is used for close observation. In addition, the sealing ring 25 is sleeved in the first annular groove 241 to achieve effective sealing, thereby ensuring the stability and sealing performance of the connection.

In this embodiment, a control module 6 is arranged on sight main body 1. The control module 6 includes a control button 61 and a first main board 62 configured for receiving and sending users' operation instructions. A control switch 621 is arranged on the first main board 62. The control button 61 is movable between a pressed position and a releasing position. When the control button 61 is in the pressed position, the control button 61 is configured for abutting against the control switch 621 to achieve a communication connection. When the control button 61 is in the releasing position, the control button 61 is configured for detaching from the control switch 621. In addition, a side wall of the control button 61 is configured for abutting against an inner wall of the sight main body 1. Through the arrangement of the above structure, the control module 6 features the cooperation between the control button 61 and the control switch 621. The control button 61 is preferably made of silicone. When the control button 61 is in the pressed position, the control button 61 is configured for abutting against the control switch 621 to achieve the communication connection. When the control button 61 is in the releasing position, the control button 61 is configured for detaching from the control switch 621. In addition, the side wall of the control button 61 is configured for abutting against the inner wall of the sight main body 1. This enables users to directly operate device functions through the control button 61, thereby ensuring the reliability of the signal transmission. Meanwhile, the side wall of the control button 61 is configured for tightly abutting against the inner wall of the sight main body 1, which increases waterproof performance.

In this embodiment, the sight main body 1 further includes a power supply assembly 8. The power supply assembly 8 includes a battery chamber 82, a power supply battery 83 and a battery cover 84. The battery chamber 82 is positioned in the sight main body 1. The power supply battery 83 is detachably arranged in the battery chamber 82. When the power supply battery 83 is arranged in the battery chamber 82, a positive electrode of the power supply battery 83 is electrically connected to an electrical contact of the battery chamber 82. The battery cover 84 is configured for covering the battery chamber 82. An electrical contact of the battery cover 84 is electrically connected to a negative electrode of the power supply battery 83. The power supply battery 83 is electrically connected to the objective lens optical system 220 and the display screen 152, so as to provide working power supply for the objective lens optical system 220 and the display screen 152. Through the arrangement of the above structure, the power supply assembly 8 provides a stable power supply for an entire system, through the coordination of the battery chamber 82, the power supply battery 83, and the battery cover 84, as well as an electrical connection between the power supply battery 83 and various electrical components. The detachable design of the power supply battery 83 makes it easy for users to replace the battery, thereby ensuring the continuous working capability of the equipment.

In this embodiment, an accommodating cavity 19 is arranged in the sight main body 1. The first main board 62 is arranged in the accommodating cavity 19. A first portion of the control button 61 is positioned in the accommodating cavity 19, and a second portion of the control button 61 is positioned on an upper surface of the sight main body 1. Through the arrangement of the above structure, the arrangement of the accommodating cavity 19 provides a safe mounting space for the first main board 62. Moreover, the separable design of the control button 61 ensures both the protection of internal electronic components and the convenience of user operation.

In this embodiment, the sight main body 1 further includes a second main board 7, and the second main board 7 is positioned in the accommodating cavity 19. The display screen is electrically connected to the objective lens optical system 220 through the second main board 7. Through the arrangement of the above structure, the second main board 7 through an electrical connection with the display screen 152 and the objective lens optical system 220, as well as the arrangement of being positioned in the accommodating cavity 19, so as to achieve professional processing and transmission of image signals. Moreover, this ensures the stability of display quality.

In this embodiment, the sight main body 1 further includes a distance measuring module 181. The distance measuring module 181 is configured for transmitting distance information to the display module 15 to display by measuring target distance. Through the arrangement of the above structure, the distance measuring module 181 is configured for providing users with an accurate distance measuring function. In this way, users can obtain real-time target distance information, and the information is visually displayed on the display module 15. Moreover, users can make accurate aiming adjustments and trajectory compensation according to the distance information, thereby greatly improving shooting accuracy and usage efficiency.

In this embodiment, the objective optical lens 2 is further provided with a sleeve 28, a cover cap 29, a rotating cavity 30 and a connection block 34. The sleeve 28 is sleeved on an outer wall of the objective lens housing 210. The rotating cavity 30 is arranged at a top portion of the sleeve 28. The cover cap 29 is movably connected to the rotating cavity 30 through the connection block 34, and the cover cap 29 is movable between an open position and a covered position. When the cover cap 29 is in the covered position, the cover cap 29 is configured for covering an opening of the sleeve 28. When the cover cap 29 is in the open position, the cover cap 29 is configured for opening the opening of the sleeve 28. Through the arrangement of the above structure, the cover cap 29 is movably connected to the rotating cavity 30 through the connection block 34. This enables the cover cap 29 to be movable between the open position and the covered position. Thus, the objective optical lens 2 is provided with an effective protection function, thereby preventing precise optical components from being damaged by dust and accidental collisions.

In this embodiment, the sight further includes a mounting base 4. The mounting base 4 includes a mounting base body 41 and an interface portion 42. The interface portion 42 is arranged on the mounting base body 41, and the interface portion 42 is configured for coordinating with a guide rail interface of external equipment. The mounting base body 41 is equipped with a first through hole 43 and a second through hole 44. The mounting base body 41 is connected to the mounting housing 16 via the first through hole 43 and the second through hole 44. A width between the first lug unit 172 and the second lug unit 173 is bigger than a width of the mounting base 4. During use, install the mounting base 4 on the mounting housing 16 firstly, and then install the rotating sleeve 17 on the mounting housing 16. The first lug unit 172 and the second lug unit 173 are configured for abutting against the mounting base 4. Lastly, the first adjusting screw 1741 is configured for passing through the first screw hole 1721 and the first through hole 43 and screwing in the first mounting hole 145; the second adjusting screw 1742 is configured for passing through the second screw hole 1722 and the second through hole 44 and screwing in the second mounting hole 146. In this way, the rotating sleeve 17 and the mounting base 4 is fixedly connected on the mounting housing 16 simultaneously. In addition, the interface portion 42 of the mounting base 4 is in cooperation with the guide rail interface of external equipment. This enables the sight to be quickly mounted on a variety of different weapon platforms and also improves product versatility.

Figure 10:
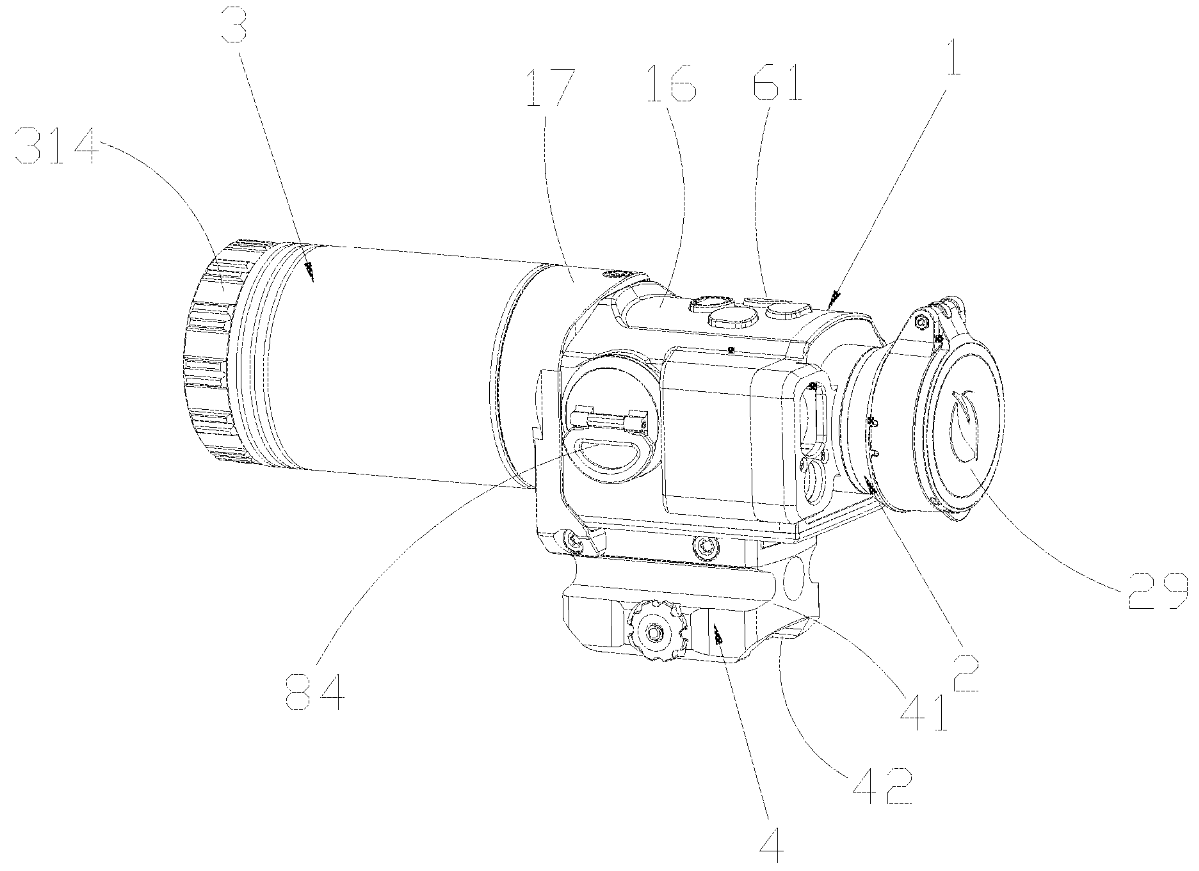
FIG. 10 is an overall structure diagram of the second embodiment of the present invention.
Figure 11:
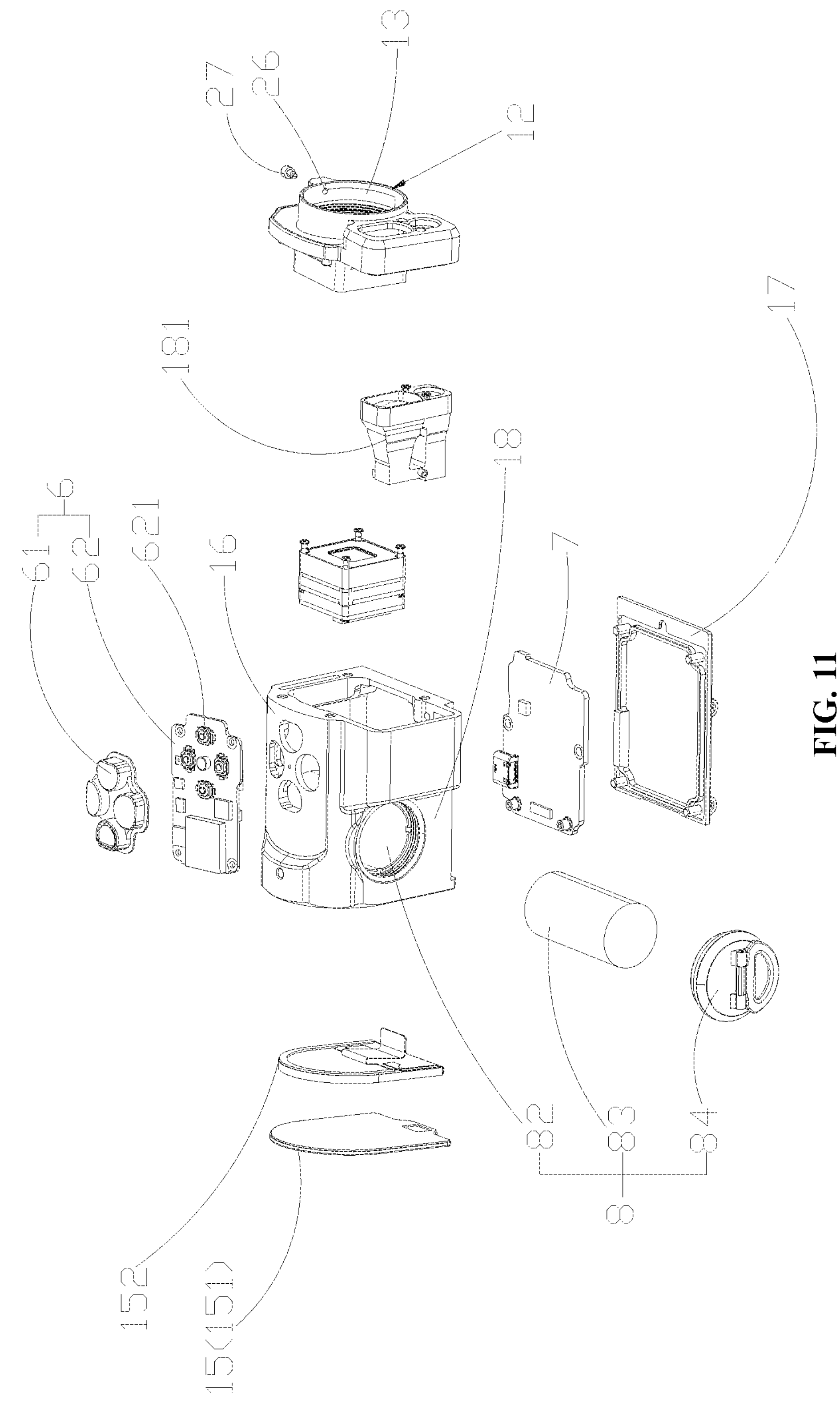
FIG. 11 is an exploded structure diagram of the main body of the present invention.
Figure 12:
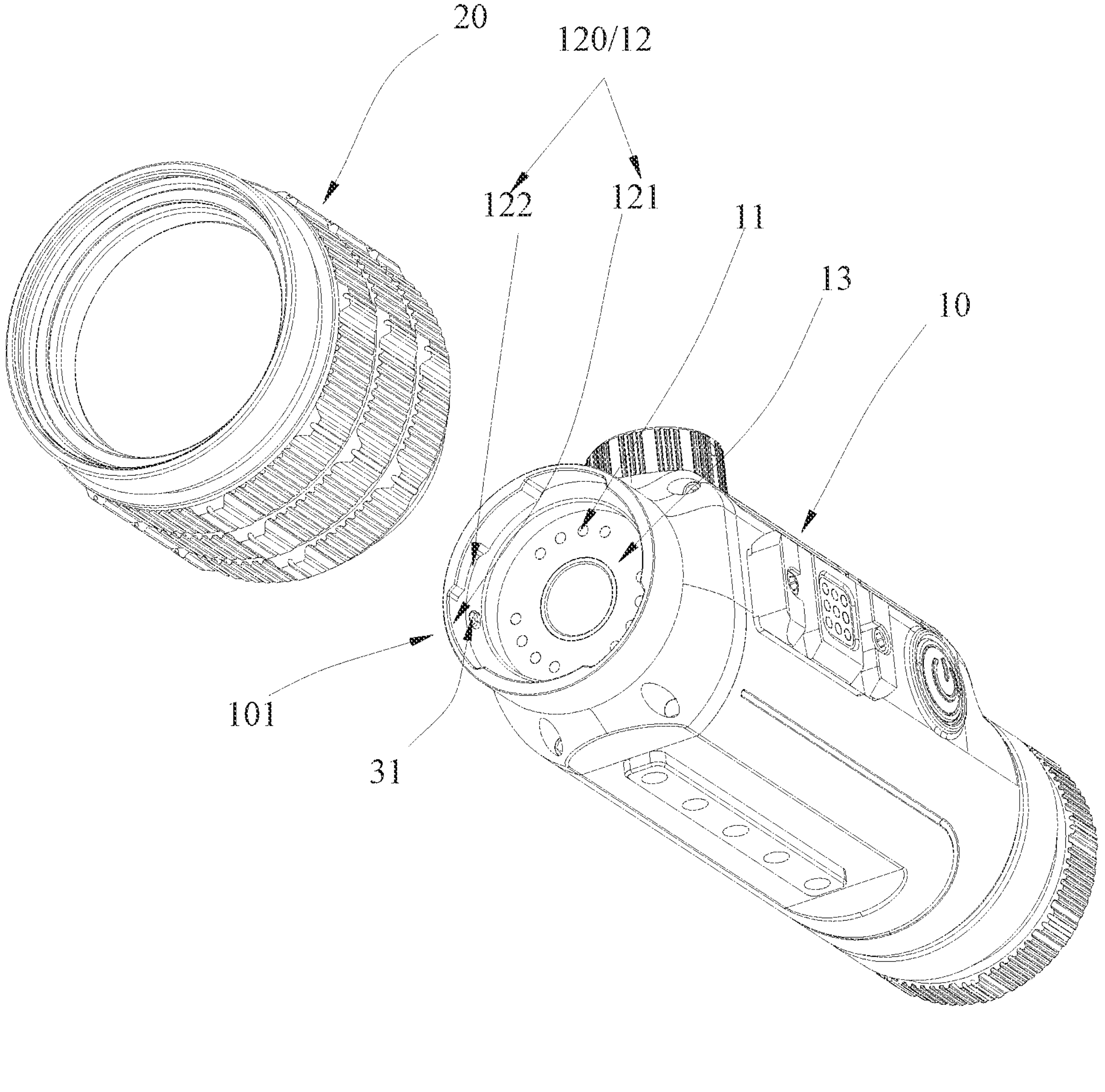
FIG. 12 is an exploded view of another embodiments provided by the present invention.
Figure 13:
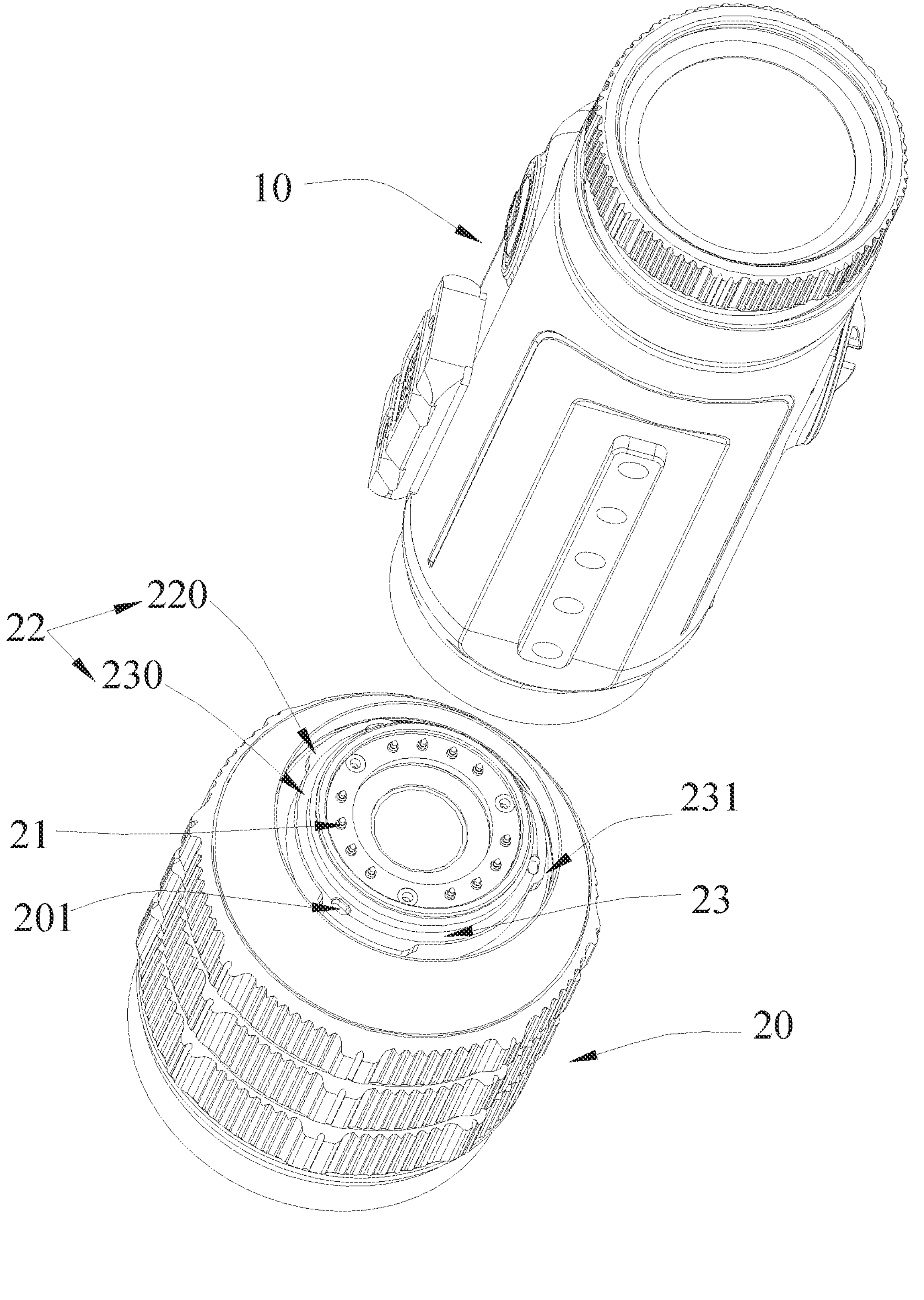
FIG. 13 is another exploded view of another embodiments provided by the present invention.

Referring to FIG. 10 and FIG. 11, in other embodiments, a first snap-fit member 12 is arranged around a first electrical connection assembly 11, and a second snap-fit member 22 is arranged around a second electrical connection assembly 21. The second snap-fit member 22 is engaged in the first snap-fit member 12, so that the objective lens 20 is detachably connected to a main body 10. When the second snap-fit member 22 is engaged in the first snap-fit member 12, the second electrical connection assembly 21 is configured for abutting against the first electrical connection assembly 11, so that the objective lens 20 is electrically connected to the main body 10. An end surface on a connecting end of the main body 10 is provided with a first groove 13. The first electrical connection assembly 11 and the first snap-fit member 12 are both arranged in the first groove 13. An end surface on a connecting end of the objective lens 20 connected to the main body 10 is provided with a second groove 23. The second snap-fit member 22 and the second electrical connection assembly 21 are both arranged in the second groove 23. When the objective lens 20 is installed on the main body 10, the second groove 23 is configured for wrapping the first groove 13, or the first groove 13 is configured for wrapping the second groove 23. The objective lens 20 and the main body 10 are both provided with grooves. This enables a connection between the objective lens 20 and the main body 10 to be tighter, and makes the stability of installing the objective lens 20 greater. Thus, when users shaking at any moment, the objective lens 20 is not easily to be separated from the main body, which protects the objective lens 20 and avoids causing damage to the users.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A sight with a detachable eyepiece, comprising:

a sight main body, the sight main body comprising an observation portion and a connection portion opposite to the observation portion, and a side of the sight main body close to the observation portion being provided with a mounting portion;

an objective optical lens, the objective optical lens being connected to the connection portion;

an eyepiece lens, wherein the eyepiece lens is detachably connected to the mounting portion, and the eyepiece lens is configured for observation;

wherein the eyepiece lens comprises an eyepiece housing and an eyepiece optical system arranged in the eyepiece housing, the eyepiece optical system is connected to the eyepiece housing, the eyepiece housing is detachably connected to the mounting portion, and the eyepiece optical system is configured for observation;

the objective optical lens comprises an objective lens housing and an objective lens optical system arranged in the objective lens housing;

wherein the objective lens housing is provided with a first connection portion, and the first connection portion is arranged along an end surface of the objective lens housing;

wherein the eyepiece housing is equipped with a second connection portion, the mounting portion is a first mounting port, and the second connection portion is detachably connected to the first mounting port.

2. The sight with a detachable eyepiece according to claim 1, wherein the sight main body is provided with a display module, the eyepiece optical system is arranged facing the display module, and the eyepiece optical system is configured for magnifying images of the display module.

3. The sight with a detachable eyepiece according to claim 2, wherein the objective lens optical system is electrically connected to the display module, and the display module is configured for displaying images collected by the objective lens optical system.

4. The sight with a detachable eyepiece according to claim 1, wherein an outer side wall of the second connection portion is equipped with a first external thread, an inner side wall of the first mounting port is equipped with a first internal thread, the first external thread is connected to the first internal thread, and the first external thread is capable of rotating along the first internal thread.

5. The sight with a detachable eyepiece according to claim 4, wherein the sight main body comprises a mounting housing and a rotating sleeve, the first mounting port is arranged in the rotating sleeve, a first end of the rotating sleeve is connected to the mounting housing through a connection assembly, and the second connection portion is connected to a second end of the rotating sleeve.

6. The sight with a detachable eyepiece according to claim 5, wherein a lower side of the rotating sleeve is configured for extending to form a plurality of lugs, the plurality of lugs comprise a first lug unit and a second lug unit, the first lug unit and the second lug unit are spaced apart from each other, and the first lug unit and the second lug unit are detachably connected to the mounting housing through the connection assembly.

7. The sight with a detachable eyepiece according to claim 6, wherein the connection assembly comprises a first adjusting screw, a second adjusting screw and a third adjusting screw, the first lug unit is provided with a first screw hole, the second lug unit is provided with a second screw hole, an upper side of the rotating sleeve is provided with a third screw hole, a lower side of the mounting housing is equipped with a first mounting hole and a second mounting hole, an upper side of the mounting housing is equipped with a third mounting hole, when the rotating sleeve is connected on the mounting housing, the first adjusting screw is configured for sequentially passing through the first screw hole and the first mounting hole and connecting the rotating sleeve to the mounting housing, the second adjusting screw is configured for sequentially passing through the second screw hole and the second mounting hole and connecting the rotating sleeve to the mounting housing, and the third adjusting screw is configured for sequentially passing through the third screw hole and the third mounting hole and connecting the rotating sleeve to the mounting housing.

8. The sight with a detachable eyepiece according to claim 1, wherein the display module is a display screen, the display module further comprises a touch screen, the touch screen is arranged in parallel with the display screen, the touch screen is electrically connected to the display screen, the touch screen and the display screen are both arranged in the sight main body, the display screen is electrically connected to the objective lens optical system, and the touch screen and the display screen are positioned between the objective optical lens and the eyepiece lens.

9. The sight with a detachable eyepiece according to claim 8, wherein a control module is arranged on sight main body, the control module comprises a control button and a first main board configured for receiving and sending users' operation instructions, a control switch is arranged on the first main board, the control button is movable between a pressed position and a releasing position, when the control button is in the pressed position, the control button is configured for abutting against the control switch to achieve a communication connection, when the control button is in the releasing position, the control button is configured for detaching from the control switch, and a side wall of the control button is configured for abutting against an inner wall of the sight main body.

10. The sight with a detachable eyepiece according to claim 9, wherein the sight main body further comprises a power supply assembly, the power supply assembly comprises a battery chamber, a power supply battery and a battery cover, the battery chamber is positioned in the sight main body, the power supply battery is detachably arranged in the battery chamber, when the power supply battery is arranged in the battery chamber, a positive electrode of the power supply battery is electrically connected to an electrical contact of the battery chamber, the battery cover is configured for covering the battery chamber, and an electrical contact of the battery cover is electrically connected to a negative electrode of the power supply battery; the power supply battery is electrically connected to the objective lens optical system and the display screen, so as to provide working power supply for the objective lens optical system and the display screen.

11. The sight with a detachable eyepiece according to claim 1, wherein the eyepiece optical system comprises a first lens, a second lens and an optical channel, and the first lens is arranged on a first end of the eyepiece housing; the second lens is arranged on a second end of the eyepiece housing; the optical channel is arranged between the first lens and the second lens; the first lens and the second lens are arranged along an axial direction, and a complete optical path system is thereby formed through the optical channel.

12. A sight with a detachable eyepiece, comprising:

a sight main body, the sight main body comprising an observation portion and a connection portion opposite to the observation portion, and a side of the sight main body close to the observation portion being provided with a mounting portion;

an objective optical lens, the objective optical lens being connected to the connection portion;

an eyepiece lens, wherein the eyepiece lens is detachably connected to the mounting portion, and the eyepiece lens is configured for observation;

wherein the eyepiece lens comprises an eyepiece housing and an eyepiece optical system arranged in the eyepiece housing, the eyepiece optical system is connected to the eyepiece housing, the eyepiece housing is detachably connected to the mounting portion, and the eyepiece optical system is configured for observation;

wherein the sight main body is provided with a display module, the eyepiece optical system is arranged facing the display module, and the eyepiece optical system is configured for magnifying images of the display module;

wherein the objective optical lens comprises an objective lens housing and an objective lens optical system arranged in the objective lens housing, the objective lens optical system is electrically connected to the display module, and the display module is configured for displaying images collected by the objective lens optical system;

wherein the objective lens housing is provided with a first connection portion, and the first connection portion is arranged along an end surface of the objective lens housing;

wherein the connection portion is provided with a second mounting port, and the first connection portion is detachably connected to the second mounting port.

13. The sight with a detachable eyepiece according to claim 12, wherein an outer side wall of the first connection portion is equipped with a second external thread, an inner side wall of the second mounting port is equipped with a second internal thread, the second external thread is connected to the second internal thread, and the second external thread is capable of rotating along the second internal thread.

14. The sight with a detachable eyepiece according to claim 13, wherein the second mounting port is equipped with a fourth adjusting screw, the fourth adjusting screw is connected to the sight main body, the fourth adjusting screw is movable between an adjusting position and a locked position, when the fourth adjusting screw is in the locked position, the fourth adjusting screw is configured for tightly abutting against the first connection portion, so that the objective optical lens is not capable of detaching from the second mounting port, and the objective optical lens is capable of rotating in the second mounting port; when the fourth adjusting screw is in the adjusting position, the fourth adjusting screw is configured for separating from the first connection portion, and the second external thread is capable of rotating along the second internal thread, so that the objective optical lens is enabled to detach from the second mounting port.

15. The sight with a detachable eyepiece according to claim 14, wherein a plurality of annular grooves and a sealing ring are arranged on a side wall of the first connection portion, the sealing ring is sleeved on one of the plurality of annular grooves, the sealing ring is tightly compressed by an inner wall of the second mounting port, and inner walls of the annular grooves are tightly compressed by the sealing ring.

16. The sight with a detachable eyepiece according to claim 15, wherein a fourth screw hole is arranged on a side wall of the second mounting port, the plurality of annular grooves comprise a first annular groove and a second annular groove, the sealing ring is sleeved on the first annular groove, when the objective optical lens is installed in the second mounting port, the fourth adjusting screw is configured for abutting against the second annular groove through the fourth screw hole, the second annular groove is equipped with a first limiting portion and a second limiting portion, when the fourth adjusting screw abuts against the first limiting portion, the fourth adjusting screw is configured for adjusting the objective optical lens to conduct remote observation, and when the fourth adjusting screw abuts against the second limiting portion, the fourth adjusting screw is configured for adjusting the objective optical lens to conduct close observation.

17. A sight with a detachable eyepiece, comprising:

a sight main body, the sight main body comprising an observation portion and a connection portion opposite to the observation portion, and a side of the sight main body close to the observation portion being provided with a mounting portion;

an objective optical lens, the objective optical lens being connected to the connection portion;

an eyepiece lens, wherein the eyepiece lens is detachably connected to the mounting portion, and the eyepiece lens is configured for observation;

wherein the eyepiece lens comprises an eyepiece housing and an eyepiece optical system arranged in the eyepiece housing, the eyepiece optical system is connected to the eyepiece housing, the eyepiece housing is detachably connected to the mounting portion, and the eyepiece optical system is configured for observation;

wherein the eyepiece optical system comprises a first lens, a second lens and an optical channel, and the first lens is arranged on a first end of the eyepiece housing; the second lens is arranged on a second end of the eyepiece housing; the optical channel is arranged between the first lens and the second lens; the first lens and the second lens are arranged along an axial direction, and a complete optical path system is thereby formed through the optical channel;

wherein the eyepiece housing comprises an inner housing, an outer housing, an adjusting housing and an adjusting ring sleeved on the adjusting housing, and the inner housing is arranged in an inner portion of the eyepiece housing; the outer housing is sleeved at an outer portion of the inner housing; the adjusting housing is movably arranged on the inner housing, the adjusting housing is positioned between the inner housing and the outer housing, the first lens is installed on an end portion of the inner housing, and the second lens is installed on an end portion of the adjusting housing; the optical channel is formed between the first lens and the second lens, and the adjusting ring is rotatably sleeved at an outer portion of the outer housing; the adjusting ring is threadedly connected to the adjusting housing; by rotating the adjusting ring to drive the adjusting housing to move along an axial direction, an axial distance between the first lens and the second lens is thereby adjusted.

* * * * *